United States Patent
Ramsey et al.

(10) Patent No.: US 7,181,449 B2
(45) Date of Patent: Feb. 20, 2007

(54) METHOD, SYSTEM, AND PROGRAM PRODUCT FOR EXECUTING A SCALAR FUNCTION ON A VARYING NUMBER OF RECORDS WITHIN A RDBMS USING SQL

(75) Inventors: Mark Steven Ramsey, Colleyville, TX (US); Milind Chitgupakar, Omaha, NE (US); Calisto Paul Zuzarte, Pickering (CA)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 11/018,466

(22) Filed: Dec. 21, 2004

(65) Prior Publication Data
US 2006/0136415 A1    Jun. 22, 2006

(51) Int. Cl.
*G06F 7/00* (2006.01)
*G06F 17/00* (2006.01)
(52) U.S. Cl. ........................................... 707/3; 707/102
(58) Field of Classification Search ................ 707/102, 707/104.1, 2, 3, 4, 1, 5; 715/507
See application file for complete search history.

(56) References Cited

U.S. PATENT DOCUMENTS

| | | | |
|---|---|---|---|
| 6,285,996 B1 | 9/2001 | Jou et al. | 707/4 |
| 6,411,951 B1* | 6/2002 | Galindo-Legaria et al. | 707/3 |
| 6,581,068 B1* | 6/2003 | Bensoussan et al. | 707/104.1 |
| 6,748,392 B1 | 6/2004 | Galindo-Legaria et al. | 707/102 |
| 2002/0087516 A1 | 7/2002 | Cras et al. | 707/2 |
| 2002/0143748 A1 | 10/2002 | Cu et al. | 707/3 |
| 2004/0117731 A1* | 6/2004 | Blyashov | 715/507 |
| 2004/0153448 A1 | 8/2004 | Cheng et al. | 707/4 |

* cited by examiner

*Primary Examiner*—Sam Rimell
*Assistant Examiner*—Rezwanul Mahmood
(74) *Attorney, Agent, or Firm*—Richard M. Goldman

(57) ABSTRACT

Application of a scalar function across a varying number of records within an RDBMS using the RDBMS's SQL capabilities. This is accomplished by determining a last row in a group of rows, sorting the rows and passing the sorted rows to a scalar function, where the scalar function accepts each row and stores the accepted rows in a temporary file space. When the last row is encountered, the aggregate value is calculated using all of the rows in the group, and then a filter is applied on the rows so that only a row with the aggregate value is returned.

3 Claims, 3 Drawing Sheets

METHOD, SYSTEM, AND PROGRAM PRODUCT FOR EXECUTING A SCALAR FUNCTION ON A VARYING NUMBER OF RECORDS WITHIN A RDBMS USING SQL

BACKGROUND OF THE INVENTION

1. Field of the Invention

The invention relates to a method, system, and program product for ordering, ranking, and retrieving of data stored in a database and to performing scalar operations on selected data rows stored in the database.

2. Description of Related Art

Numerous businesses process large numbers of transactions, including purchases of goods and services, repairs, maintenance management, inventory management, check clearing, bank account deposits and withdrawals, automatic teller machine transaction processing, credit card and debit card transaction processing, investment portfolio transaction processing (such as securities long sales and short sales, securities purchases, and margin account transactions), inventory management, and the like. The number of transactions per customer, the number of customers, the sequence of transactions, the frequency of transactions, and the magnitude of total transactions all can show subtle relationships, predict events, and conceal various anomalies, including fraud, inventory shrinkage, credit worthiness problems, identity theft, equipment failures, impending equipment failures, accident and failure "hot spots" and the like.

For example, a credit card company may create a risk score or a fraud score for a customer based on an analysis of that customer's usage of the credit card during a finite period, such as sixty or ninety days. Since different typical customers may have used their credit cards different numbers of times during the sixty or ninety days, the actual number of transactions for a specific customer will not be known in advance. It is frequently necessary to capture a customer's transaction history, for example, to derive a risk score, or to detect an anomalous set of transactions, for entry into an RDBMS, for subsequent access and use by other applications or processes.

Similarly, POS (Point of Sale) transaction analysis, either alone or in conjunction with customer loyalty and affinity programs allows a merchant to review market baskets, which vary between customers and for one customer over time, to analyze customer behavior.

Another area of transaction analysis is inventory management, including maintenance management and predictive maintenance. In this context transaction analysis of seemingly unrelated sub-unit failures or of seemingly unrelated repair orders and unrelated work orders, can be a predictor of larger future system failures.

Previously, these transaction analysis tasks have had a high overhead cost, especially in terms of processing, memory operations, and system bandwidth. There are several current approaches for this problem. One approach is for the data to be pre-processed by the RDBMS and then passed to an analytic application as an extracted flat row. Alternatively, an application can be written and used to retrieve specific data for each individual customer and pass the data to the analytic application for analysis. In each case, the score is captured into the RDBMS by again accessing the RDBMS.

The problem becomes especially severe with scalar aggregates. Relational database management systems provide a number of built in aggregate functions within the SQL language. These functions, such as MAX or COUNT, work across a group of rows within the RDBMS, where the rows are as defined, for example, in the GROUP BY clause. Many organizations have the need to execute custom scalar functions across multiple rows in the RDBMS, but do not have the mechanism, in terms of a particular scalar function or set of scalar functions, to perform the task.

Within this context, and given the very large numbers of transactions stored in the RDBMS and the many processes performed by the RDBMS, and the need to generate aggregates in order to analyze for anomalies and patterns (or elements of patterns) in any one transaction or row, or in a small set of rows or transactions, all within a large universe of transactions and rows, a clear need exists for a method, system, and program product to efficiently execute a scalar function on a variable number of rows (rows) within a RDBMS using the RDBMS' SQL, and to do so without storing intermediate rows (rows) in memory or to be pre-processed, especially in a large-scale partitioned RDBMS.

This is especially so for aggregates used to produce an individual customer score (as a risk assessment, buying pattern, customer loyalty, calling pattern, travel pattern, maintenance and/or spare parts pattern or failure or maintenance histories) result a customer or customers whose rows are in the RDBMS, and to produce the customer score quickly and simply with minimal system overhead.

As used herein "row" and "row" are used interchangeability, where "row" represents a "row" in a matrix representation of a database.

When a "customer score" is referred to herein, it is to be understood that the method, system, and program product described herein can be used to detect such profile items as buying patterns, calling patterns, travel patterns, spare parts and maintenance requirements, as well as anomalies, trends, and predictions in check processing, bank account deposit and withdrawal processing, automatic teller machine transaction processing, credit card and debit card transaction processing, investment portfolio transaction processing (such as securities long sales and short sales, securities purchases, and margin account transactions), inventory management, maintenance predictions, failure predictions, and the like, and unless the context indicates the contrary, such transactions are intended to be encompassed within the broad term of "customer score."

SUMMARY OF THE INVENTION

Described herein is a method, system, and program product to apply a scalar function across a varying number of records within an RDBMS using the RDBMS's SQL capabilities. This is done by determining a last row in a group of rows, sorting the rows and passing the sorted rows to a scalar function, where the scalar function accepts each row and stores the accepted rows in a temporary file space. When the last row is encountered, the desired aggregate value is calculated using all of the rows in the group, and then a filter is applied on the rows so that only a row with the aggregate value is returned.

In the prior art, applying a scalar function across varying numbers of records would normally have been done by querying the database for all of the rows or entries of an account, then sending those entries to an application to calculate the result of the function, and then placing the result back in the database. This means that the database would have to be queried once for each "master account" to retrieve the individual transactions, process them, and then move on to the next. This would require significant time to complete.

To illustrate, in the case of a credit score, if the company wants to update the credit score for all of the individuals in the database, the prior art would require a database query for each and every entry. Thus, if the database contained 25,000,000 individuals, it would take 25,000,000 database queries to retrieve the transactions for all of the customers, and then to process the transactions to create the credit score. However, using the method described herein, a single call to the database would be processed by the RDBMS and create the score for each of the 25,000,000 individuals, with the data not moving or being extracted to an external function. This results in an significant improvement in the creation, for example, credit scores in contrast to the prior art.

BRIEF DESCRIPTION OF THE DRAWINGS

The above objects and advantages of the invention will be illustrated by describing in detail the preferred embodiments thereof with reference to the attached drawings.

DETAILED DESCRIPTION

In large organizations customer metrics, measures, factors, and scores are evaluated through many varied and complex scoring models/algorithms. For example, at financial institutions today, consumer's credit worthiness is evaluated through scoring models/algorithms (example being FICO score for mortgages) and each consumer is assigned a score. The scoring models use the credit and demographic information to evaluate the consumer's credit worthiness and assign a numeric value to each consumer record.

Figure 1:
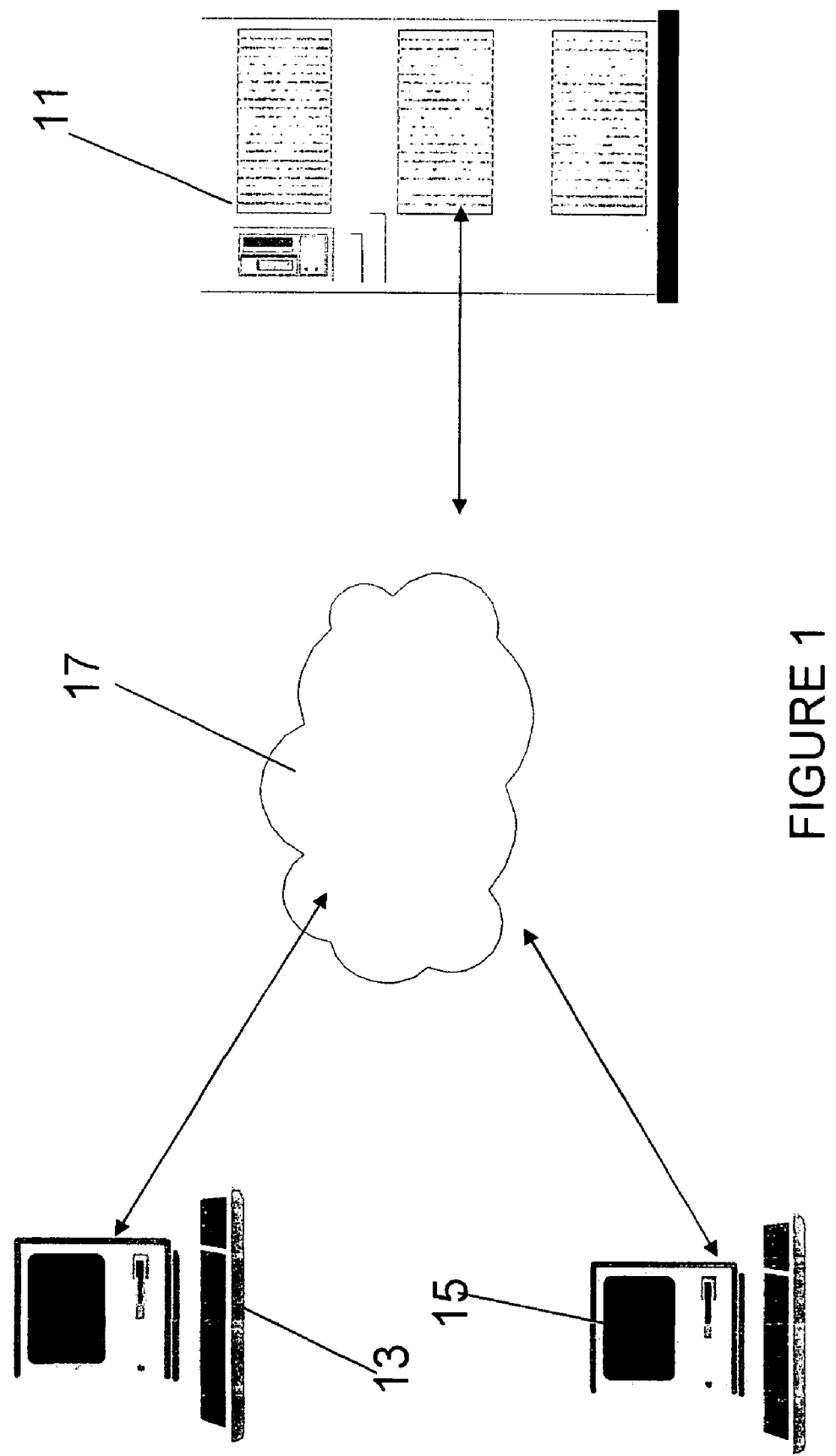
FIG. 1 represents a simplified overview of a database management system, showing a server and two terminals connected through an internet.

This is accomplished in a database management system having the hardware and platforms as illustrated in FIG. 1. FIG. 1 represents a simplified overview of a database management system, showing a server 11 with two client terminals 13 and 15 connected to server 11 through an internet 17.

The credit data could be related to the 'credit cards', 'auto loans', 'home mortgage' etc. Some of the common fields/columns are 'credit limit', 'account balance', 'loan terms', 'payment information', 'payment default info' etc. In the case of an inventory, spare parts, or maintenance database, the fields/columns could be part numbers, system id numbers, installation dates, repair dates, replacement dates, and the like.

Each consumer could have multiple rows of credit data in the database, each row representing a separate source of credit data. Similarly, each unit or sub-unit could have multiple rows of parts data, where each row represents a separate source of, for example, service life data. A scoring model/algorithm uses this data spread across multiple rows (row) and returns a single value.

A typical model first calculates aggregate attributes at consumer level using the multiple data rows. Some of the attributes (e.g., columns or cells) could be, for example, the average 'account balance' across all credit cards of the consumer, the balance to credit ratio across all credit cards or credit accounts, the sum of all the outstanding loan balances, and the sum of all the outstanding mortgage balances, or such physical system data items as equivalent full power hours, operational hours, shut-downs, start-ups, landings and takeoffs, and the like.

These attributes are then assigned numeric weights based on the attribute relevancy to a given model. The score that is returned is the sum of numeric weights multiplied by the attribute value.

While we illustrate the method, system, and program product of our invention using credit data and credit and credit risk scores, it is to be understood that the method, system, and program could be used with any database item, such as purchases of goods and services, repairs, and the like for such tasks as maintenance management, inventory management, check clearing, bank account deposit and withdrawal monitoring, automatic teller machine transaction processing, credit card and debit card transaction processing, investment portfolio transactions (such as securities long sales and short sales, securities purchases, and margin account transactions), inventory management, and the like. The number of transactions per customer, the number of customers, the sequence of transactions, the frequency of transactions, and the magnitude of total transactions can show subtle relationships, predict events, and conceal various anomalous or future anomalous events or transactions, including fraud, inventory shrinkage, credit worthiness problems, identity theft, major equipment maintenance, equipment failures, etc.

Our approach executes these models efficiently within the database, that is, without pre-processing and without copying rows to another processor or process. This is accomplished by a method, system, and program product for applying the scalar function across a varying number of records in a relational database management system using and leveraging existing database management system capabilities and functions. These existing RDBM capabilities and functions include SQL capabilities. The RDBMS functionalities and capabilities are used in a new and unique method against a variable number of records.

Figure 2:
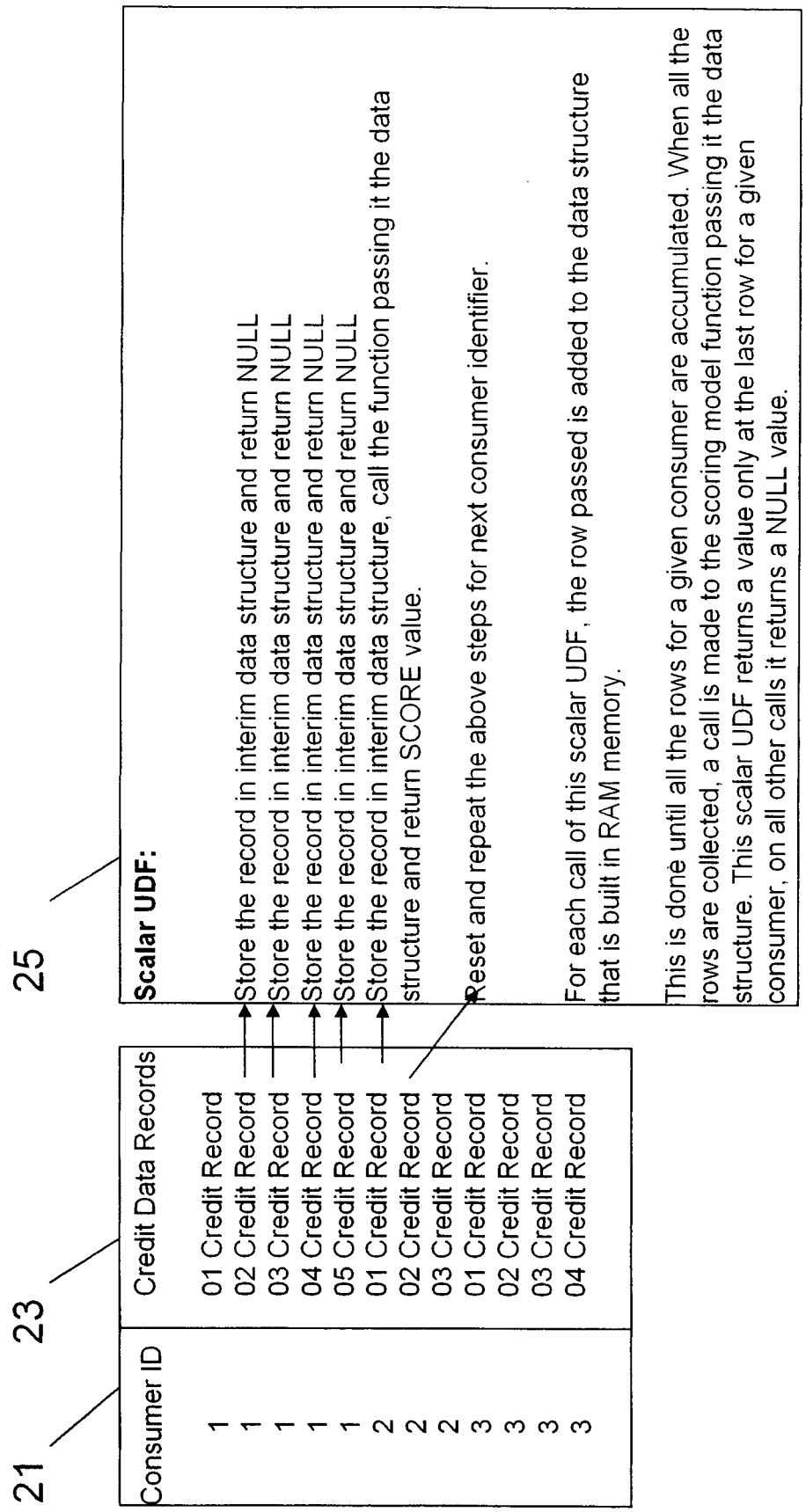
FIG. 2 represents a simplified view of a method of the invention for determining a last row in a group of rows, sorting the rows and passing the sorted rows to a scalar function.

As shown in FIG. 2, with a column for consumer ID 21, a column for credit data records 23, and a column for the Scalar UDF 25, where this is done by determining a last row in a group of rows, sorting the rows and passing the sorted rows to a scalar function, where the scalar function accepts each row and stores the accepted rows in a temporary file space. This is illustrated by storing credit records 01 through 05 of consumer 1, determining the last row of consumer 1, here row 05, in the group of rows 01 through 05, storing interim rows in an interim data structure, and returning a NULL. When the last row is encountered, the aggregate value is calculated using all of the rows in the group, and then a filter is applied on the rows so that only a row with the aggregate value is returned. The scalar function is then reset and the process repeats, e.g., for consumer ID 2 with credit records 01 through 03, and then consumer 03 with credit records 01 through 04.

This code results in only storing intermediate rows (rows) in the scratchpad memory for the group that is being currently processed, rather than storing intermediate rows (rows) for all the groups. This results in fast processing that uses less memory, does not require data pre-processing, and can be executed in a parallel partitioned database.

More particularly, to accomplish the execution of the scoring model within the database engine, a scalar function, such as a User Defined Function (UDF) or a vendor function, both referred to herein as a User Defined Function, is used. All the data record, e.g., credit data records will be sorted by consumer identifier field. The scalar UDF is called for each row of this sorted data. The UDF returns the score value only at the last row for a given consumer, on all other calls it returns a NULL value. Once the scalar UDF is called for all the rows in the sorted data, the score is associated with a given consumer by selecting only those rows that don't have NULL score values.

For each call of this scalar UDF, the row passed is added to the data structure that is built in RAM memory. This is done until all the rows for a given consumer are accumulated. When all the rows are collected, a call is made to the scoring model function passing it the data structure. This scalar UDF returns a value only at the last row for a given consumer, on all other calls it returns a NULL value.

Figure 3:
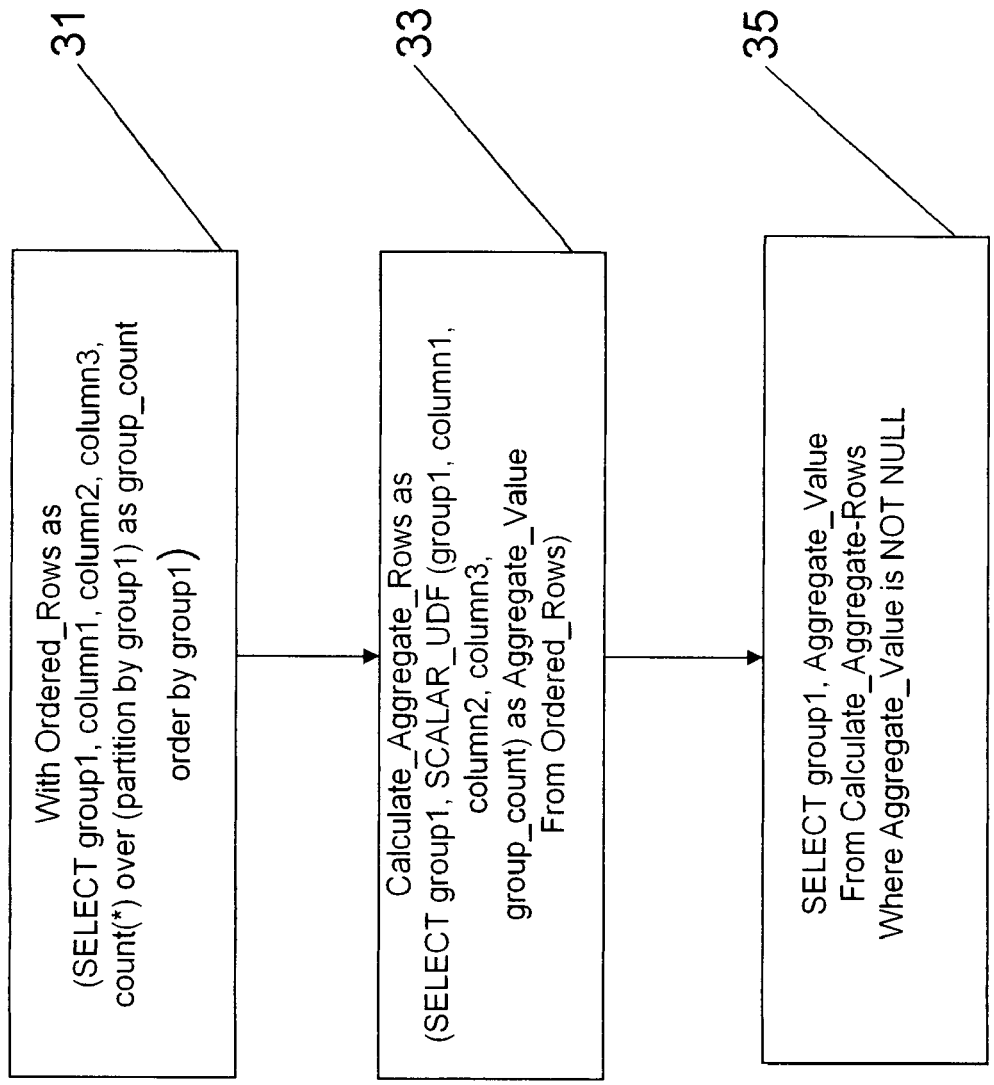
FIG. 3 represents a simplified view of a method of the invention for determining a last row in a group of rows, sorting the rows and passing the sorted rows to a scalar function, where when the last row is encountered, the aggregate value is calculated using all of the rows in the group, and then a filter is applied on the rows so that only a row with the aggregate value is returned

As shown in FIG. 3, the first step 31 in carrying out the method of the invention is to determine the last row (row) of the group. This is started by taking the count of all of the rows (rows) belonging to the group, and passed with each row of the group. The data rows (rows) are sorted by "GROUP BY clause" columns. This is accomplished by using the Common Tale Expression and OLAP aggregation function. Typical representative SQL code is:

With Ordered_Rows as (SELECT group1, column1, column2, column3, count(*) over (partition by group1) as group_count order by group1)

In the second step of the method, 33 the sorted data rows are passed the scalar function, for example, a scalar user defined function or a scalar vendor supplied function, accepts each row (row) and stores the row (row) in a scratchpad. The function, whether a scalar user defined function or a scalar vendor supplied function, supports a scratchpad to carry data, for example intermediate results, from one call to the scalar function to the next call to the scalar function.

Using the group_count column and an internal counter stored in the scratchpad, the scalar function determines if the current row (row) is the last row (row) in the group. If the current row (row) is not the last row then a NULL is returned by the scalar function.

When the last row (row) is encountered it calculates the aggregate value using all rows for that group and returns the aggregate value, rather than a NULL. Also, after calculation of the aggregate value, the scratchpad area is re-initialized for use by the next group of rows (rows). The scalar function is written as a component of the system and for executing the function across varying rows (rows) in the RDBMS.

This second part is accomplished by using a second Common Table Expression that uses the Common Table Expression defined in the first step, With Ordered_Rows as (SELECT group1, column1, column2, column3, count(*) over (partition by group1) as group_count order by group1)

Calculate_Aggregate_Rows as (SELECT group1, SCALAR_UDF (group1, column1, column2, column3, group_count) as Aggregate_Value From Ordered_Rows)

In the final step, 35 a filter is applied on the rows (rows) so that a single row (row) with aggregate value for each group is returned. Since the scalar function only returns a value for the last row (row) and all intermediate rows (rows) return NULL, the checking for the non-null value will result in a single row with aggregate value for each group.

This final step is accomplished by using an SQL filter as shown by the following code:

With Ordered_Rows as (SELECT group1, column1, column2, column3, count(*) over (partition by group1) as group_count order by group1) Calculate_Aggregate_Rows as (SELECT group1, SCALAR_UDF (group1, column1, column2, column3, group_count) as Aggregate_Value From Ordered_Rows)

SELECT group1, Aggregate_Value From Calculate_Aggregate-Rows Where Aggregate_Value is NOT NULL This approach is used to return a single value for each group of rows across multiple columns/expressions.

Some of the scalar functions that could be implemented using this approach on a single column/expression that work over a group of rows include, by way of exemplification and not limitation, include obtaining the $N^{th}$ highest value from the entries of the column for given group of rows, where N is variable, obtaining the $N^{th}$ lowest value from the entries of the column for given group of rows, where N is variable, statistical functions that are not implemented by DMBS, and computation of aggregates for user-defined types.

As most database systems allow user to define column types such as Complex, Age, etc., the approach described herein could also be used with multiple columns/expressions. Thus, given two columns ColumnA and ColumnB, a simple scalar function could return average of the ColumnA entries that meet a condition based on ColunmB.

The invention may be implemented, for example, by having the system for executing scalar functions across a variable number of rows (rows) in a database as a software application, a dedicated processor, or a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for executing scalar functions across a variable number of rows (rows) in a database as a software application in a relational database management system.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable rows, script rows and wizards for installation, as in Zip rows and cab rows. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method of applying a scalar function across a varying number of records in a relational database management system having SQL capabilities, comprising the steps of:
   a) determining a last row in a group of rows by the set of SQL commands comprising:
      i) With Ordered_Rows as (SELECT group1, column1, column2, column3, count(*) over (partition by group 1) as group_count order by group1)
      ii) Calculate_Aggregate_Rows as (SELECT group1, SCALAR_UDF (group1, column1, column2, column3, group_count) as Aggregate_Value From Ordered_Rows)
      iii) SELECT group1, Aggregate_Value From Calculate_Aggregate-Rows Where Aggregate_Value is NOT NULL to thereby return a single value for each group of rows across multiple columns/expressions;
   b) sorting said rows and passing the sorted rows to a scalar function, said scalar function adapted to accept each row and store the accepted rows in a temporary file space;
   c) when a last row is encountered, calculating an aggregate value using all of the rows in the group; and
   d) applying a filter on said rows so that only a row with said aggregate value is returned.

2. A relational database management system configured and controlled to have SQL capabilities and to apply a scalar function across a varying number of records by a method comprising the steps of:
   a) determining a last row in a group of rows using its SQL capabilities by the set of SQL commands comprising:
      i) With Ordered_Rows as (SELECT group1, column1, column2, column3, count(*) over (partition by group 1) as group_count order by group 1)
      ii) Calculate_Aggregate_Rows as (SELECT group1, SCALAR_UDF (group1, column1, column2, column3, group_count) as Aggregate_Value From Ordered_Rows)
      iii) SELECT group1, Aggregate_Value From Calculate_Aggregate-Rows Where Aggregate_Value is NOT NULL to thereby return a single value for each group of rows across multiple columns/expressions;
   b) sorting said rows and passing the sorted rows to a scalar function, said scalar function adapted to accept each row and store the accepted rows in a temporary file space;
   c) when a last row is encountered, calculating an aggregate value using all of the rows in the group; and
   d) applying a filter on said rows so that only a row with said aggregate value is returned.

3. A program product comprising computer readable signal bearing medium containing computer readable program code to configure and control a computer including a relational database management system having SQL capabilities to apply a scalar function across a varying number of records in the relational database management system, comprising the steps of:
   a) determining a last row in a group of rows using its SQL capabilities, by the set of SQL commands comprising:
      i) With Ordered_Rows as (SELECT group1, column1, column2, column3, count(*) over (partition by group1) as group_count order by group1)
      ii) Calculate_Aggregate_Rows as (SELECT group1, SCALAR_UDF (group1, column1, column2, column3, group_count) as Aggregate_Value From Ordered_Rows)
      iii) SELECT group1, Aggregate_Value From Calculate_Aggregate-Rows Where Aggregate_Value is NOT NULL to thereby return a single value for each group of rows across multiple columns/expressions;
   b) sorting said rows and passing the sorted rows to a scalar function, said scalar function adapted to accept each row and store the accepted rows in a temporary file space;
   c) when a last row is encountered, calculating an aggregate value using all of the rows in the group; and
   d) applying a filter on said rows so that only a row with said aggregate value is returned.

* * * * *